United States Patent
Gale et al.

(10) Patent No.: US 9,183,222 B2
(45) Date of Patent: Nov. 10, 2015

(54) MAPPING AND ASSET LIFECYCLE TRACKING SYSTEM

(71) Applicants: William Gale, Palm Coast, FL (US); Alicia Farag, Arlington Heights, IL (US); Robert J. Marros, Chicago, IL (US)

(72) Inventors: William Gale, Palm Coast, FL (US); Alicia Farag, Arlington Heights, IL (US); Robert J. Marros, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 14/165,673

(22) Filed: Jan. 28, 2014

(65) Prior Publication Data
US 2015/0213054 A1  Jul. 30, 2015

(51) Int. Cl.
*G06F 17/30* (2006.01)

(52) U.S. Cl.
CPC ............... *G06F 17/30241* (2013.01)

(58) Field of Classification Search
CPC ....... G06Q 10/10; G06Q 30/06; G06Q 20/12; G06Q 20/027; G06K 9/00288; G06K 9/32; G06K 9/228; G06K 7/10831; G06K 5/00; G06K 1/121; G06K 9/78; G06K 15/024; G06K 9/063; G06F 19/3437; G06F 21/10; G06F 3/017; G06F 11/34; G06F 13/14
USPC .............. 701/3, 50, 450, 519, 534, 532, 431, 701/444, 445, 1, 2, 301, 438; 702/154, 19; 707/1, 756, 608; 235/375, 379, 380, 235/440, 462.13; 455/566, 88, 404.2, 455/556.1, 414.1, 404.1

See application file for complete search history.

(56) References Cited

U.S. PATENT DOCUMENTS

| | | | |
|---|---|---|---|
| 3,817,411 A * | 6/1974 | Brown | 414/694 |
| 3,871,536 A * | 3/1975 | Brown | 414/694 |
| 3,950,955 A * | 4/1976 | Meeres | 405/158 |
| 6,243,483 B1 * | 6/2001 | Petrou et al. | 382/103 |
| 6,592,245 B1 * | 7/2003 | Tribelsky et al. | 362/551 |
| 6,683,614 B2 * | 1/2004 | Walls et al. | 345/506 |
| 6,920,618 B2 * | 7/2005 | Walls et al. | 715/840 |
| 6,987,877 B2 * | 1/2006 | Paz-Pujalt et al. | 382/152 |
| 7,058,657 B1 * | 6/2006 | Berno | 1/1 |
| 7,150,116 B2 * | 12/2006 | Barry | 37/466 |
| 7,359,931 B2 * | 4/2008 | Tarabzouni et al. | 709/200 |
| 7,696,879 B2 * | 4/2010 | Lange et al. | 340/572.1 |
| 7,881,890 B2 * | 2/2011 | McDonnell et al. | 702/64 |
| 8,138,960 B2 * | 3/2012 | Nonaka et al. | 342/25 A |
| 8,433,457 B2 * | 4/2013 | Garceau et al. | 701/3 |
| 8,503,794 B2 * | 8/2013 | Omer et al. | 382/209 |
| 8,525,124 B2 * | 9/2013 | Atwood et al. | 250/394 |
| 9,013,274 B2 * | 4/2015 | Doany et al. | 340/8.1 |
| 2002/0129001 A1 * | 9/2002 | Levkoff et al. | 707/1 |
| 2002/0134140 A1 * | 9/2002 | Baumoel | 73/40.5 A |
| 2003/0001556 A1 * | 1/2003 | Doany et al. | 324/67 |
| 2005/0038825 A1 | 2/2005 | Tarabzouni et al. | |
| 2005/0156776 A1 * | 7/2005 | Waite | 342/22 |

(Continued)

*Primary Examiner* — Calvin Cheung
*Assistant Examiner* — Luis A Martinez Borrero
(74) *Attorney, Agent, or Firm* — Pauley Erickson & Kottis (57) ABSTRACT

A method for creating GIS features and populating a GIS feature attribute with information obtained from a bar code or similar identifier, for example but not limited to pipelines. The method of this invention includes scanning a code on a component to be installed or repaired, converting the code into attributes which describe the component, obtaining additional characteristics of the components, associating the component with a location of installation and placing the geometric feature onto the GIS map.

17 Claims, 6 Drawing Sheets

(56) References Cited

U.S. PATENT DOCUMENTS

| | | | |
|---|---|---|---|
| 2007/0055948 A1* | 3/2007 | Cui | 715/863 |
| 2007/0265809 A1* | 11/2007 | McDonnell et al. | 702/189 |
| 2007/0288159 A1 | 12/2007 | Skelton | |
| 2007/0297752 A1* | 12/2007 | Soltysik | 386/46 |
| 2008/0252449 A1* | 10/2008 | Colvero et al. | 340/540 |
| 2009/0004410 A1* | 1/2009 | Thomson et al. | 428/29 |
| 2010/0045517 A1* | 2/2010 | Tucker et al. | 342/357.08 |
| 2010/0131185 A1 | 5/2010 | Morris et al. | |
| 2011/0181289 A1* | 7/2011 | Rushing | 324/326 |
| 2011/0270457 A1* | 11/2011 | Kreiss et al. | 700/292 |
| 2012/0066019 A1* | 3/2012 | Hinshaw et al. | 705/7.23 |
| 2012/0303304 A1* | 11/2012 | Kim et al. | 702/65 |
| 2012/0305095 A1* | 12/2012 | Zittrer | 137/15.01 |
| 2013/0060520 A1* | 3/2013 | Amor et al. | 702/154 |
| 2013/0217440 A1* | 8/2013 | Lord et al. | 455/556.1 |
| 2013/0221091 A1* | 8/2013 | Koo | 235/375 |
| 2013/0321131 A1 | 12/2013 | Tucker et al. | |
| 2014/0125651 A1* | 5/2014 | Sharp et al. | 345/419 |
| 2014/0210947 A1* | 7/2014 | Finn et al. | 348/46 |
| 2014/0312115 A1* | 10/2014 | Hyodo et al. | 235/376 |
| 2014/0324821 A1* | 10/2014 | Meiyyappan et al. | 707/715 |
| 2014/0326507 A1* | 11/2014 | Spriggs | 175/40 |
| 2014/0374480 A1* | 12/2014 | Pollack | 235/440 |

* cited by examiner

MAPPING AND ASSET LIFECYCLE TRACKING SYSTEM

BACKGROUND OF THE INVENTION

1. Field of the Invention

This invention relates to a system and process for creating new features and populating attribute information for geographic information system (GIS) features.

2. Description of Related Art

When constructing and/or repairing utility infrastructure, such as natural gas pipelines, operators must collect information during construction to create maps and records of installed assets. The current process involves manual documentation on paper records that are then entered into computer systems. This process is labor intensive and prone to error. In this process, a worker installing a part, for example a pipe, collects data related to the part, for example a pipe's dimensions, along with an installation location. The worker then enters the information into a computer including a part number, location and other information related to the asset. The operator must then map the installation using a geographic information system (GIS) program or other mapping software.

The process of creating geometric features within typical GIS software requires that the worker has training for using specific tools within the GIS or mapping software. The worker must understand the technology well enough to make decisions regarding the type of feature desired. For example, the worker needs to know that a valve should be represented as a point feature or that a pipe segment should be represented as a line feature. This system is labor intensive and subject to worker error, as such there is a need for a more consistent and efficient system for mapping utility pipelines.

SUMMARY OF THE INVENTION

This invention relates to a method and system for creating GIS features and populating the features with attribute information directly within a GIS environment by reading information directly from a barcode or similar identifier. For ease of explanation, the method of this invention will be described in connection with pipelines. However, it should be understood that this method is not limited to pipelines and may be used with other infrastructure including, but not limited to, electrical, cable, water, sewer, fiber optic systems, road & highways, buildings, and/or equipment.

It is one object of this invention to remove potential errors and to simplify the process of creating GIS features. The method and system can be utilized by field personnel with training focused on using the system of this invention and not requiring the field personnel to have in-depth training or knowledge of a GIS or a mapping program.

In a preferred embodiment, the method of mapping an asset during installation or repair includes applying a code to each installed components. In another embodiment, the code may be pre-applied to the components. In the case of pipelines, the American Society for Testing and Materials (ASTM) has created ASTM Standard F2897-11 code which is printed on a majority of components for a pipeline. The ASTM Standard F2897-11 code is a sixteen digit code which identifies multiple characteristics of the component including manufacturer, lot number, material, diameter, and component type. The sixteen digit code is preferably provided as a bar code which facilitates automated data capture to improve data quality by eliminating transcription errors. Alternatively, the code may be provided as a two-dimensional bar code, a RFID tag, and/or a NFC tag. The method of this invention includes reading the code on the component into a device having a processor and a memory, such as a computer, tablet or a smart phone. The step of reading the code to the device is preferably completed with a scanner that scans the code to capture the data. Alternatively, other means may be used to input the code into the device including manual data entry.

The method of this invention includes capturing location data and inputting this location data into the device. Preferably the location data is collected using a global positioning system (GPS) device in order to provide accurate information. However, other means of collecting the location data may be used.

The method of this invention includes a step of decoding the component code into the component's attributes. For example, the ASTM Standard F2897-11 code can be converted from the sixteen digit code into identifiers including a manufacturer, a lot number, a type of material, a diameter, and a component type. In a preferred embodiment, the system of this invention includes decision support tables which allow the program to find, compute or choose additional feature attributes which may not be provided by simply decompiling the code. Additional attributes of the components may be downloaded from a manufacturer's web site based on the identifiers to further assist the installation and mapping. The additional attributes may include other dimensions, warranties, warnings, installation guides and other related information. Once the necessary attributes are identified, the system uses the attributes to determine the type of asset in relation to GIS features. The system then automatically creates the appropriate GIS feature and uses the data encoded in the barcode to populate the GIS feature's attribute information directly in a GIS program. In a preferred embodiment, the GIS program creates a geometric feature such as a point, line or polygon to represent the installed component of the asset. The geometric feature is then associated with the location data and placed in the GIS map.

The method of this invention vastly improves the usefulness, accuracy and speed of data collection and the creation of geometric features in the GIS or any mapping system.

BRIEF DESCRIPTION OF THE DRAWINGS

These and other objects and features of this invention will be better understood from the following detailed description taken in conjunction with the drawings.

DESCRIPTION OF THE PRESENTLY PREFERRED EMBODIMENTS

The invention is directed to a method and a system for mapping assets during installation and/or repairs. For ease of explanation, the method of this invention will be described in connection with the installation of a pipeline. However, it should be understood that the invention is not limited to pipelines and may be used with any type of asset including, but not limited to, water, sewer, electrical, cable, roads & highways, equipment, and internet service.

Figure 1:
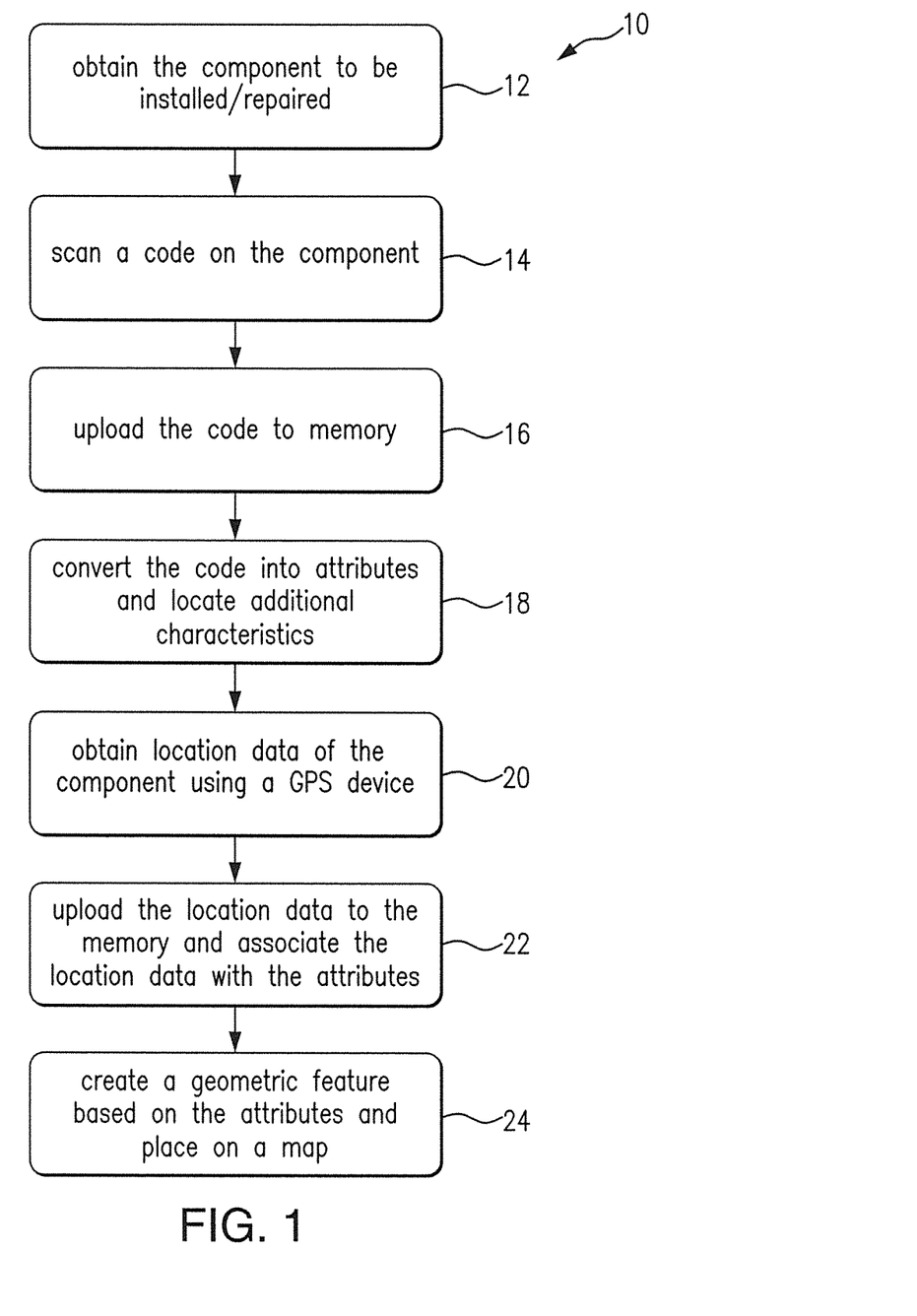
FIG. 1 is a flow chart for mapping an asset according to one embodiment of this invention.

FIG. 1 shows a flow chart 10 of the method of this invention according to a preferred embodiment. The flow chart 10 shows one order of the steps of the method of this invention, however, it should be understood that the method of this invention is not limited to this order and/or may include additional intermediary steps not shown and/or multiple steps may be combined into a single step.

Figure 2:
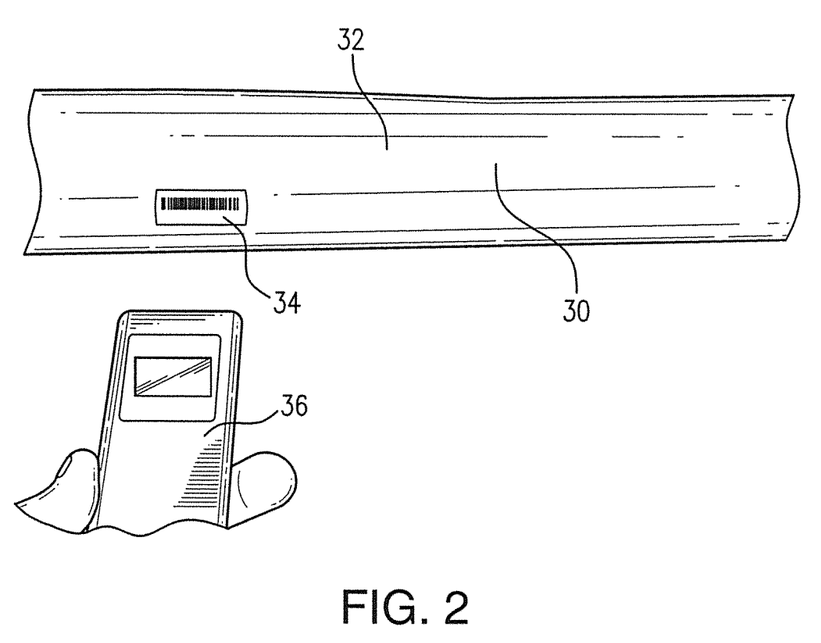
FIG. 2 shows a component to be installed with a code according to one embodiment of this invention.

As shown in FIG. 1, the method of this invention begins by obtaining a component 30 of the asset to be installed or repaired 12. As shown in FIG. 2, the component 30 is a section of pipe 32. It should be understood that the section of pipe 32 is representative of the component 30 and that the component 30 is not limited to a pipe and may comprise any type of component or components including tubing, fittings, valves, appurtenance, equipment, and any other type of part needed used for constructing the infrastructure asset. In a preferred embodiment, the component 30 includes a code 34 which embodies detailed information about the component 30. In the embodiment of FIG. 2, the code 34 comprises a bar code with an alpha-numeric identifier. However, the code 34 is not limited to the bar code and/or the alpha-numeric identifier and may comprise any type of code including, but not limited to, a two-dimensional bar code, a radio-frequency identification (RFID) tag, and a near-field communication (NFC) tag.

The method of this invention further includes the steps of scanning the code 14 and storing the code to a memory 16. According to one preferred embodiment of this invention, the code 34 is American Society for Testing and Materials (ASTM) Standard F2897-11 code for parts for a pipeline. The ASTM Standard F2897-11 code is a sixteen digit code based on characteristics of the component including a component manufacturer, a manufacture lot number, a production date, a component material, a component dimension or size, and other information.

The step 14 of scanning the code 34 may be accomplished with a reader 36, such as a bar code scanner as shown in FIG. 2. However, the step 14 may be accomplished with any reader 36 capable of scanning the code 34, such as, but not limited to, a RFID reader, an NFC reader, a smart phone, a tablet computer, and a QR reader. Alternatively, the code 14 may be entered to memory through manual entry of the numerical code.

In a preferred embodiment, the step 16 of storing the code to memory comprises uploading the code 34 to a device such as a computer, a tablet, or a smart phone or any other device having a memory and/or a processor.

In the embodiment of this invention shown in FIG. 1, the method 10 further includes a program to convert the code 34 into attributes 46 that further describe characteristics of the part 30, step 18. For example, the ASTM Standard F2897-11 code described above is a sixteen digit code that is used in conjunction with natural gas assets such as, pipes, tubing, fittings, valves, appurtenances, etc. The ASTM Standard F2897-11 code comprises numbers which have been converted into fewer characters by switching from base 10 to base 62. The following table explains the code:

| Digits | Identifier | Description | Conversion |
| --- | --- | --- | --- |
| 1-2 | Component Manufacturer | A two character code assigned to each manufacturer by Plastic Pipe Institute | None |

-continued

| Digits | Identifier | Description | Conversion |
| --- | --- | --- | --- |
| 3-6 | Manufacturer's Lot Code | 7 digits assigned by the manufacturer to identify the product | Convert to 4 characters with base 62 |
| 7-9 | Production Date | 5 digits representing the day of the year (3 digits) and the year (2 digits) | Convert to 3 characters with base 62 |
| 10 | Component Material | 1 letter representing the material | None |
| 11-12 | Component Type | 2 character code representing the type of part, set by ASTM | None |
| 13-15 | Component Size | 5 digits code that is set using an equation and tables established by ASTM | Convert to 3 characters using base 62 |
| 16 | Unused | 0 | None |

Figure 3:
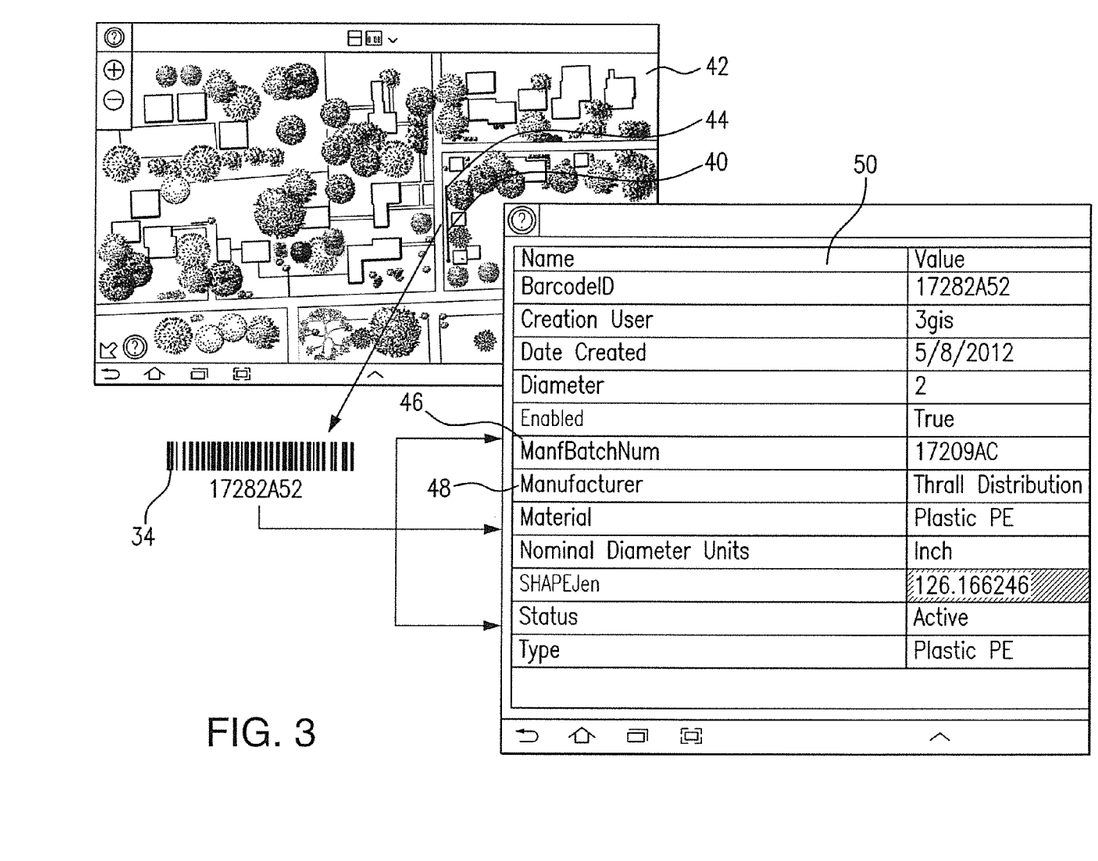
FIG. 3 shows a GIS map with a line representing a pipe and an association between a code on the pipe and identifiers in a table, according to one embodiment of this invention.

As shown in FIG. 3, the method of this invention uses the program to decode the code 34 back to the attributes, listed in columns 2 and 3 above. After the program converts the code, the program preferably populates a database 50 with attribute information 46. In a preferred embodiment, the program uses the attribute information 46 to locate additional characteristics 48 of the part 34 and stores the additional characteristics 48 to the database 50. In one embodiment, the program uses tables, preferably stored locally on the device, to gather additional characteristics of the component. In another embodiment, the program may access a manufacturer's web site to gather information such as warranty details, maintenance/replacement schedules, installation details, part dimensions, and any other information which may be useful.

Figure 4:
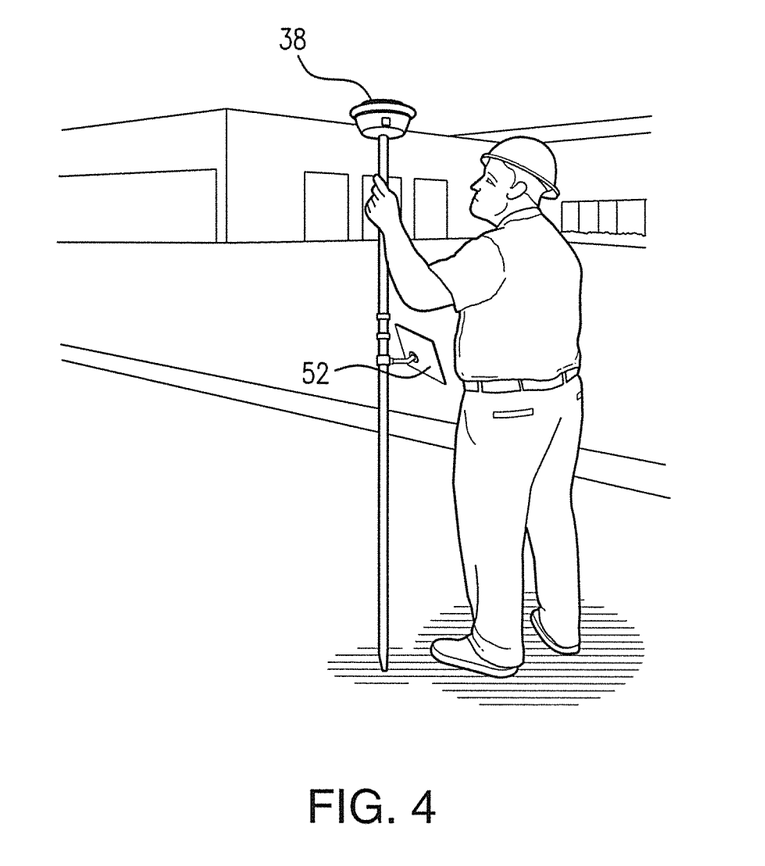
FIG. 4 shows a GPS receiver and a tablet device with GIS based data collection software, according to one embodiment of this invention.

Preferably, after the component 30 is installed or repaired and will no longer be moved, the method of this invention further includes a step 20 of collecting location data and storing the location data to memory. Collecting location data is preferably accomplished with a Global Positioning System (GPS) device 38. For example, FIG. 4 shows a worker with a GPS receiver 38. In this embodiment, the GPS receiver is connected to a tablet 52 which can run the program of this invention and/or allows a user to upload the data. Alternatively, the device 38 may be any type of GPS or Global Navigation Satellite System (GNSS) receiver including, but not limited to, those included in a smart phone and a tablet computer. In an alternative embodiment, the step 18 of collecting location data may be accomplished through use of manual positioning on a map.

In a preferred embodiment of this invention, the method 10 next includes a step 22 of associating the location data with the code 34 representing the component 30. In a preferred embodiment, this step comprises saving the location data to the database 50 which includes at least one of the attributes 46 and the characteristics 48.

Figure 5:
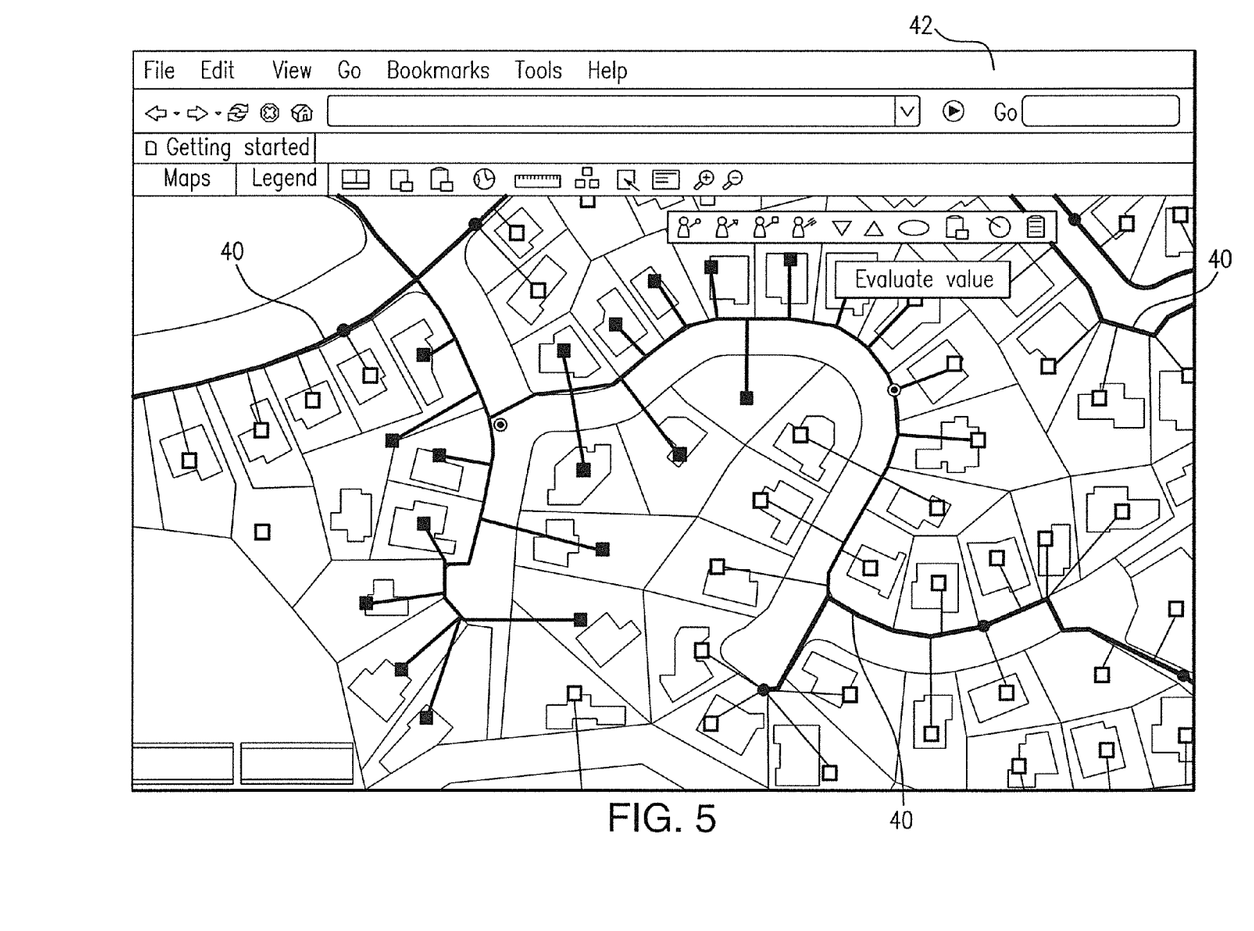
FIG. 5 shows another GIS map with geometric features representing components of the asset, according to one embodiment of this invention.
Figure 6:
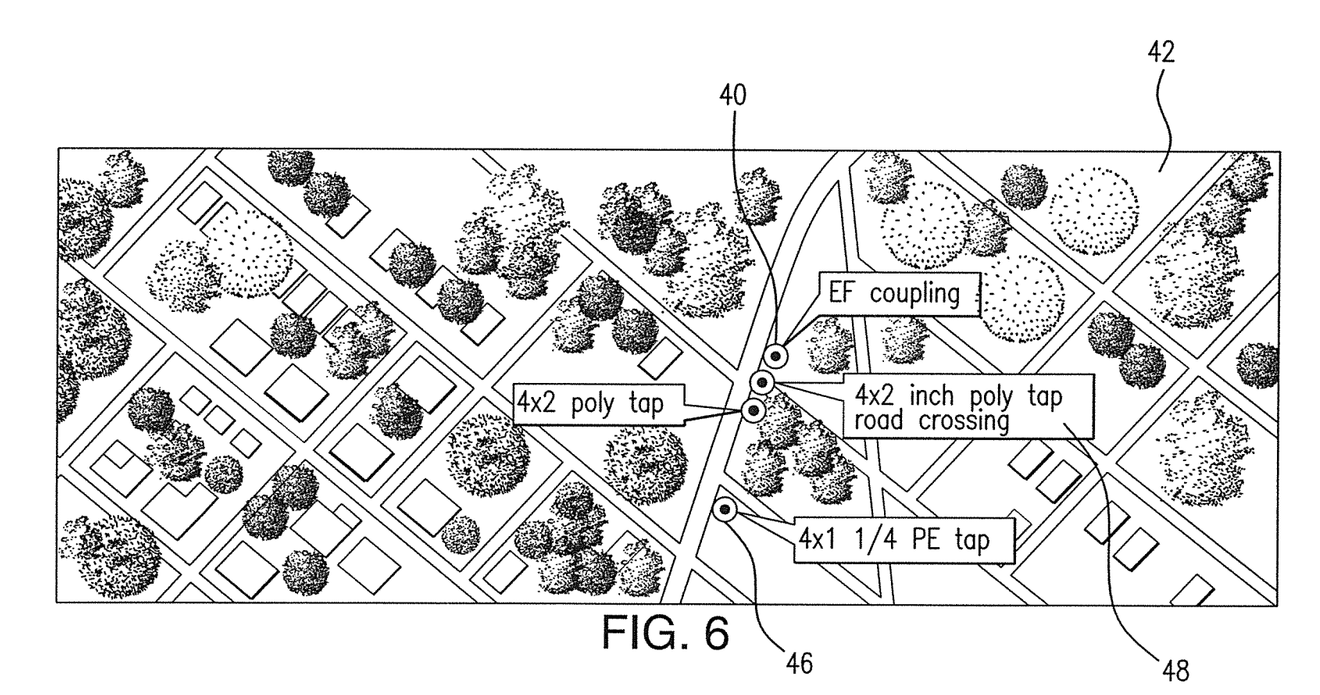

In a preferred embodiment of this invention, the method 10 next includes a step 24 of creating a geometric feature 40 within the geographic information system (GIS) to represent the component 30 and placing the geometric feature 40 on a map 42 to represent the installed component. The geometric feature 40 may comprise one of a point, line, circle, polygon, arrow or any other symbol to represent the installed component. For example, in FIG. 3, the GIS shows a map 42 with a line 44 representing the installed pipeline. In FIG. 5, another map is shown with lines and arrows representing various installed components. In a preferred embodiment, each of the geometric features 40 may be selectable to access additional information of the installed components including, but not limited to, a descriptor, a date of installation, a material type, and manufacturer.

Thus the invention provides a method and system for mapping and asset lifecycle tracking of assets. More specifically, the invention provides a method of creating GIS features and populating GIS features with attribute information based on information contained in a barcode or similar identifier.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A method of mapping an asset during installation or repair, the method comprising:
   inputting a code from a component of the asset into a device having a processor and a memory;
   the processor automatically decoding the code into attributes;
   the processor automatically gathering characteristics of the component based on the attributes, wherein the characteristics include at least one of maintenance schedules, replacement dates, installation details, dimensions, and warranty details;
   the processor automatically creating a geometric feature based on the attributes and the characteristics;
   identifying a location of the component using one of a global positioning system device and a manual mapping process;
   storing the location in the memory;
   associating the component with the location; and
   the processor automatically placing the geometric feature on a Geographic Information System (GIS) map.

2. The method of claim 1, wherein the code comprises an American Society for Testing and Materials (ASTM) F2897 code.

3. The method of claim 1, wherein the code comprises one or more of a bar code, a two-dimensional bar code, a radio-frequency identification (RFID) tag, and a near field communication (NFC) tag.

4. The method of claim 1, wherein the step of inputting the code from the component comprises scanning the code with a bar code scanner.

5. The method of claim 1, wherein the GIS map comprises a part of a Geographic Information System (GIS) program.

6. The method of claim 1, wherein the device comprises one of a lap top, a smart phone, a tablet, and a desktop computer.

7. The method of claim 1, wherein the step of collecting additional characteristics of the component utilizes decision support tables to obtain the additional characteristics.

8. A method of mapping a natural gas pipeline comprising:
   scanning an American Society for Testing and Materials (ASTM) F2897 code from a natural gas component into a device having a processor and a memory;
   the processor automatically decompiling the American Society for Testing and Materials (ASTM) F2897 code into attributes and populating a database with the attributes;
   the processor automatically creating a geometric feature from the attributes;
   identifying a location of the natural gas component using a global positioning system device and associating the location with the attributes; and
   the processor automatically placing the geometric feature on a Geographic Information System (GIS) map.

9. The method of claim 8, further comprising:
   uploading the American Society for Testing and Materials (ASTM) F2897 code to a cloud to provide access to the code from remote devices.

10. The method of claim 8, wherein the code comprises one or more of a bar code, a two-dimensional bar code, a radio-frequency identification (RFID) tag, and a near field communication (NFC) tag.

11. The method of claim 8, wherein the map comprises a part of a Geographic Information System (GIS) program.

12. The method of claim 11, further including a step of:
   managing a lifecycle of the natural gas component with the Geographic Information System (GIS) program for maintenance and repairs.

13. The method of claim 8, further comprising a step of:
   populating the database with additional characteristics of the natural gas component based on the attributes.

14. The method of claim 13, wherein the additional characteristics of the component are located using decision support tables.

15. The method of claim 8, wherein the geometric feature comprises one of a line, an arrow, a point, a circle and a polygon to represent the natural gas component.

16. The method of claim 8, wherein the device comprises one of a lap top, a smart phone, a tablet, and desk top computer.

17. A method of mapping an asset during installation or repair, the method comprising:
   scanning a barcode from a component of the asset into a device having a processor and a memory;
   the processor automatically decoding the barcode into attributes;
   the processor automatically gathering characteristics of the component based on the attributes, wherein the characteristics include maintenance schedules, replacement dates, installation details, dimensions, and warranty details;
   the processor automatically creating a geometric feature based on the attributes and the characteristics;
   identifying a location of the component using one of a global positioning system device;
   storing the location in the memory;
   associating the component with the location; and
   the processor automatically placing the geometric feature on a Geographic Information System (GIS) map.

* * * * *